US011051268B2

(12) United States Patent
Liu

(10) Patent No.: US 11,051,268 B2
(45) Date of Patent: Jun. 29, 2021

(54) SERVICE ACTIVATION AND DEACTIVATION METHOD, DEVICE AND COMPUTER STORAGE MEDIUM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/857,644

(22) Filed: Apr. 24, 2020

(65) Prior Publication Data
US 2020/0252897 A1   Aug. 6, 2020

Related U.S. Application Data

(63) Continuation of application No. PCT/CN2017/111914, filed on Nov. 20, 2017.

(51) Int. Cl.
*H04W 60/00* (2009.01)
*H04W 8/02* (2009.01)
H04W 36/00 (2009.01)

(52) U.S. Cl.
CPC ............. *H04W 60/00* (2013.01); *H04W 8/02* (2013.01); *H04W 36/0033* (2013.01)

(58) Field of Classification Search
CPC ..... H04W 60/00; H04W 76/11; H04W 48/18; H04W 60/005; H04W 76/10; H04W 76/12; H04W 8/08
See application file for complete search history.

(56) References Cited

U.S. PATENT DOCUMENTS

| 6,591,105 B1 | 7/2003 | Hussain et al. |
| 2014/0355590 A1 | 12/2014 | Cho et al. |
| 2017/0332421 A1 | 11/2017 | Sternberg et al. |
| 2018/0227873 A1* | 8/2018 | Vrzic .................... H04W 48/17 |
| 2019/0109823 A1* | 4/2019 | Qiao .................... H04L 12/1435 |
| 2020/0084613 A1* | 3/2020 | Ying ....................... H04W 8/22 |
| 2020/0170067 A1* | 5/2020 | Kawasaki ............. H04W 80/08 |

FOREIGN PATENT DOCUMENTS

| CN | 101296504 A | 10/2008 |
| CN | 101754181 A | 6/2010 |
| CN | 103220636 A | 7/2013 |
| CN | 105722138 A | 6/2016 |

(Continued)

OTHER PUBLICATIONS

SA WG2 Meeting #S2-123 S2-177296; Oct. 23-27, 2017, Ljubljana, Slovenia.

(Continued)

*Primary Examiner* — Nam T Huynh

(57) ABSTRACT

Disclosed in the disclosure are a method, a device and a computer storage medium for service activation and deactivation. The method includes a terminal sends indication information to a network entity in the process of initiating registration to the network entity, wherein the indication information is used to indicate to the network entity a service that needs to be activated and/or a service that needs to be deactivated.

24 Claims, 3 Drawing Sheets

(56) References Cited

FOREIGN PATENT DOCUMENTS

| CN | 103348749 B | 6/2017 |
|---|---|---|
| CN | 103535093 B | 10/2017 |
| EP | 3419351 A1 | 12/2018 |
| RU | 2455790 C2 | 7/2012 |
| WO | 2017142362 A1 | 8/2017 |

OTHER PUBLICATIONS

International Search Report dated Jul. 27, 2018 for PCT/CN2017/111914.
Extended European Search Report for EP Application 17932330.8 dated Oct. 1, 2020.
3GPP TSG-CT WG1 Meeting #106; Kochi (India), Oct. 23-27, 2017; C1-174057.
SA WG2 Meeting #122bis; Aug. 21-25, 2017, Sophia Antipolis, France; S2-175846.
3GPP TS 23.502 V0.3.0 (Mar. 2017); 3rd Generation Partnership Project; Technical Specification Group Services and System Aspects; Procedures for the 5G System; Stage 2 (Release 15).
Russia Office Action with English Translation for RU Application 2020115104/07(025023) dated Nov. 16, 2020.
India Examination Report for IN Application 202017017382 dated Apr. 30, 2021.

* cited by examiner

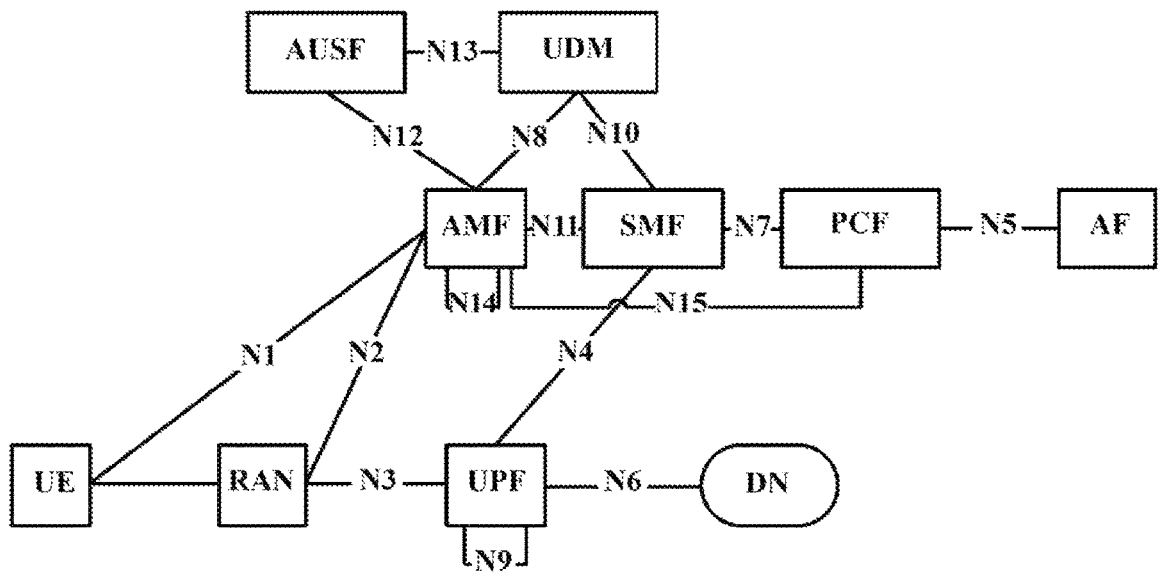
FIG. 1
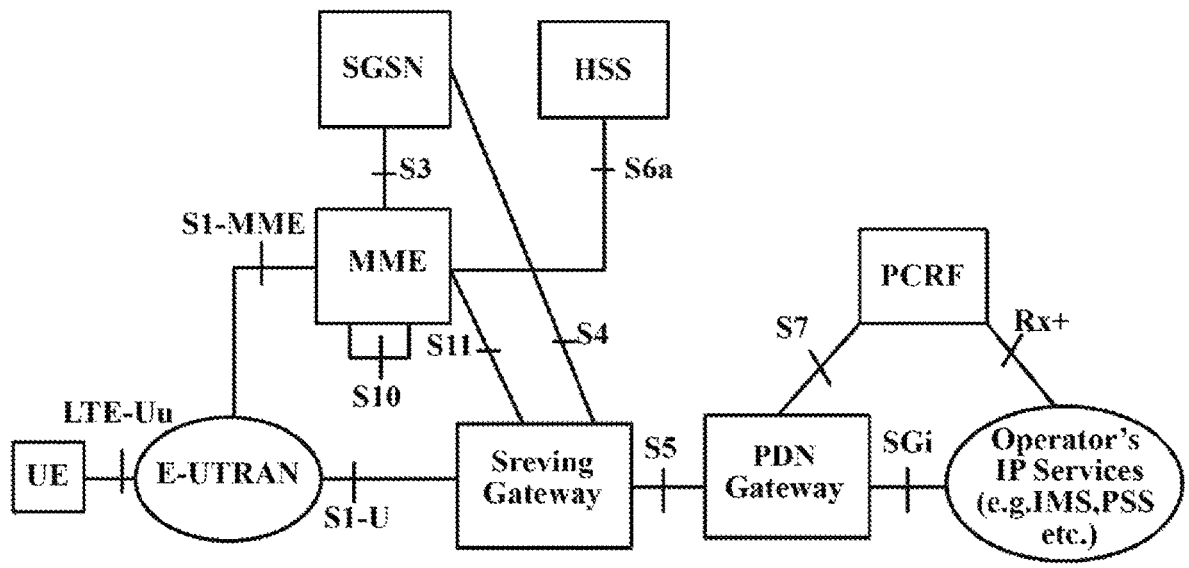
FIG. 2
In a process of initiating registration to a network entity, a terminal sends indication information to the network entity, wherein the indication information is used for indicating a service needing activation and/or a service needing deactivation to the network entity
301
FIG. 3

SERVICE ACTIVATION AND DEACTIVATION METHOD, DEVICE AND COMPUTER STORAGE MEDIUM

CROSS-REFERENCE TO RELATED APPLICATION(S)

The present application is a continuation application of International Application No. PCT/CN2017/111914, filed on Nov. 20, 2017, which is hereby incorporated by reference in its entirety.

TECHNICAL FIELD

The present disclosure relates to the field of mobile communication technology, in particular to a method, a device and a computer storage medium for service activation and deactivation.

BACKGROUND

After registering to a network for a first time, a terminal will create some service information with a network element of a core network, such as Protocol Data Unit (PDU) session information, etc. When entering an idle state, the terminal will also store the service information, and when the terminal registers to the network again, it will confirm with the network element of the core network whether locally stored service information is valid, and activate all services. However, not all services need to be activated, in some scenarios, the terminal only needs to activate a part of the services. A current mode for service activation results in waste of resources.

SUMMARY

To solve above technical problems, implementations of the present disclosure provide a method, a device and a computer storage medium for service activation and deactivation.

A method for service activation and deactivation is provided by an implementation of the present disclosure, and the method includes: during a registration procedure initiated by a terminal to a network entity, a terminal sends indication information to the network entity, wherein the indication information is used for indicating a service to be activated and/or a service to be deactivated to the network entity.

In an implementation of the present disclosure, during the registration procedure initiated by the terminal to the network entity, sending, by the terminal, the indication information to the network entity includes: during the registration procedure initiated by the terminal to the network entity, the terminal sends indication information carrying a list of services to be activated and/or a list of services to be deactivated to the network entity; herein, the list of services to be activated includes service information of at least one service to be activated, and the list of services to be deactivated includes service information of at least one service to be deactivated.

In an implementation of the present disclosure, the service information at least includes identification information of a service.

In an implementation of the present disclosure, the service information at least includes identification information of a Public Land Mobile Network (PLMN) entity to which a service belongs or identification information of a network slice to which a service belongs.

In an implementation of the present disclosure, sending, by the terminal, the indication information to the network entity includes: the terminal sends a registration request message to the network entity, wherein the registration request message carries the indication information.

In an implementation of the present disclosure, sending, by the terminal, the indication information to the network entity includes: the terminal sends a registration completion message to the network entity, wherein the registration completion message carries the indication information.

In an implementation of the present disclosure, during the registration procedure initiated by the terminal to the network entity, sending, by the terminal, the indication information to the network entity includes: in a process of initiating attachment to the network entity, the terminal sends the indication information to the network entity.

In an implementation of the present disclosure, during the registration procedure initiated by the terminal to the network entity, sending, by the terminal, the indication information to the network entity includes: in a process of initiating location area update to the network entity, the terminal sends the indication information to the network entity.

In an implementation of the present disclosure, during the registration procedure initiated by the terminal to the network entity, sending, by the terminal, the indication information to the network entity includes: in a process of initiating tracking area update to the network entity, the terminal sends the indication information to the network entity.

In an implementation of the present disclosure, the indication information is further used for triggering the network entity to release a context of the service to be deactivated.

In an implementation of the present disclosure, in a situation that a network entity is changed, sending, by the terminal, the indication information to the network entity includes: the terminal sends the indication information to a destination network entity, wherein the indication information is used for triggering the destination network entity to perform following operations: sending the indication information to a source network entity; receiving a context of a service to be activated sent by the source network entity.

In an implementation of the present disclosure, the indication information is used for triggering the source network entity to perform following operations: based on the indication information, determining the service to be activated, and sending the context of the service to be activated to the destination network entity; and the indication information is used for triggering the source network entity to perform following operations: based on the indication information, determining a service to be deactivated, and deleting a context of the service to be deactivated.

In an implementation of the present disclosure, the service to be activated or the service to be deactivated includes one or more of following services: a Protocol Data Unit (PDU) session, a Packet Data Network (PDN) connection, a Quality of Service (QoS) flow, a bearer, and a data flow.

In an implementation of the present disclosure, the network entity is a core network element.

A device for service activation and deactivation is provided by an implementation of the present disclosure, and the device includes: a registration unit, configured to initiate a registration procedure to a network entity; and an indication unit, configured to, during the registration procedure to the network entity, send indication information to the network entity, wherein the indication information is used for indicating a service to be activated and/or a service to be deactivated to the network entity.

In an implementation of the present disclosure, the indication unit is specifically configured to, during the registration procedure to the network entity, send indication information carrying a list of services to be activated and/or a list of services to be deactivated to the network entity; herein, the list of services to be activated includes service information of at least one service to be activated, and the list of services to be deactivated includes service information of at least one service to be deactivated.

In an implementation of the present disclosure, the service information at least includes identification information of a service.

In an implementation of the present disclosure, the service information at least includes identification information of a PLMN to which a service belongs or identification information of a network slice to which a service belongs.

In an implementation of the present disclosure, the indication unit is specifically configured to send a registration request message to the network entity, wherein the registration request message carries the indication information.

In an implementation of the present disclosure, the indication unit is specifically configured to send a registration completion message to the network entity, wherein the registration completion message carries the indication information.

In an implementation of the present disclosure, the indication unit is specifically configured to, in a process of initiating attachment to the network entity, send the indication information to the network entity.

In an implementation of the present disclosure, the indication unit is specifically configured to, in a process of initiating location area update to the network entity, send indication information to the network entity.

In an implementation of the present disclosure, the indication unit is specifically configured to, in a process of initiating tracking area update to the network entity, send indication information to the network entity.

In an implementation of the present disclosure, the indication information is further used for triggering the network entity to release a context of the service needed be deactivated.

In an implementation of the present disclosure, in a situation that a network entity is changed, the indication unit is specifically configured to send the indication information to a destination network entity, wherein the indication information is used for triggering the destination network entity to perform following operations: sending the indication information to a source network entity; and receiving a context of the service to be activated sent by the source network entity.

In an implementation of the present disclosure, the indication information is used for triggering the source network entity to perform following operations: based on the indication information, determining the service to be activated, and sending the context of the service to be activated to the destination network entity; and the indication information is used for triggering the source network entity to perform following operations: based on the indication information, determining a service to be deactivated, and deleting a context of the service to be deactivated.

In an implementation of the present disclosure, the service to be activated or the service to be deactivated includes one or more of following services: a PDU session, a PDN connection, a QoS flow, a bearer, and a data flow.

In an implementation of the present disclosure, the network entity is a core network element.

A computer storage medium is provided by an implementation of the present disclosure, on which computer-executable instructions are stored, and when the computer-executable instructions are executed by a processor, the above-mentioned method for service activation and deactivation is implemented.

In a technical solution of an implementation of the present disclosure, a terminal sends indication information to a network entity during a registration procedure to the network entity, and the indication information is used for indicating a service to be activated and/or a service to be deactivated to the network entity.

BRIEF DESCRIPTION OF DRAWINGS

The drawings described herein are for purposes of providing a further understanding of the present disclosure and form a part of the present application. The illustrative implementations of the present disclosure and the description thereof are for purposes of explaining the present disclosure and are not intended to unduly limit the present disclosure.

FIG. 1 is a schematic diagram of systemic architecture of a 5G network according to an implementation of the present disclosure;

FIG. 2 is a schematic diagram of systemic architecture of a 4G network according to an implementation of the present disclosure;

FIG. 3 is a schematic flowchart of a method for service activation and deactivation according to an implementation of the present disclosure.

DETAILED DESCRIPTION

Figure 4:
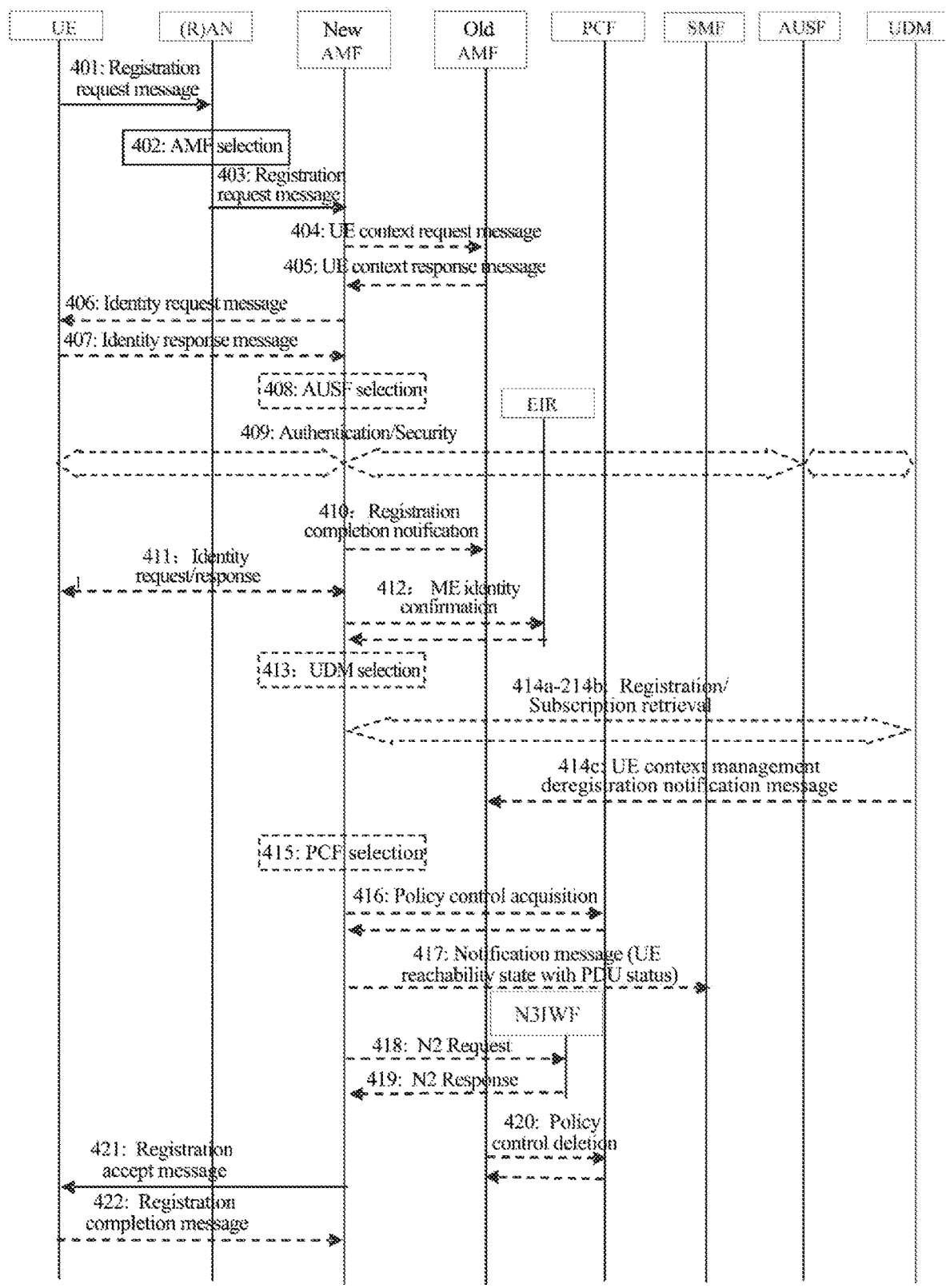
FIG. 4 is a schematic flowchart of a method for service activation and deactivation according to an implementation of the present disclosure.

To understand features and technical contents of implementations of the present disclosure in more detail, implementations of the implementations of the present disclosure will be described in detail below with reference to the drawings, which are used for reference and illustration only and are not intended to limit the implementations of the present disclosure.

FIG. 1 is a schematic diagram of systemic architecture of a 5G network according to an implementation of the present disclosure. As shown in FIG. 1, devices involved in the 5G network system include: a User Equipment (UE), a Radio Access Network (RAN), a User Plane Function (UPF), a Data Network (DN), a Core Access and Mobility Management Function (AMF), a Session Management Function (SMF), a Policy Control function (PCF), an Application Function (AF), an Authentication Server Function (AUSF), and a Unified Data Management (UDM).

FIG. 2 is a schematic diagram of systemic architecture of a 4G network according to an implementation of the present disclosure. As shown in FIG. 2, devices involved in the 4G network system include: a User equipment (UE), an Evolved Universal Terrestrial Radio Access Network (E-UTRAN), a Mobility Management Entity (MME), a Serving GPRS Support Node (SGSN), a Home Subscriber Server (HSS), a Serving Gateway, a Packet Data Network (PDN) Gateway, and a Policy and Charging Rules Function (PCRF).

The above examples of FIG. 1 and FIG. 2 are only examples of network architectures for implementing the implementations of the present disclosure, and the implementations of the present disclosure are not limited to the network architectures described in FIG. 1 and FIG. 2.

FIG. 3 is a schematic flowchart of a method for service activation and deactivation according to an implementation of the present disclosure. As shown in FIG. 3, the method for service activation and deactivation includes following act 301.

In act 301: during a registration procedure to a network entity, a terminal sends indication information to the network entity, wherein the indication information is used for indicating a service to be activated and/or a service to be deactivated to the network entity.

In an implementation, the indication information carries a list of services to be activated.

In an implementation, the indication information carries a list of services to be deactivated.

Herein, the list of services to be activated includes service information of at least one service to be activated, and the list of services to be deactivated includes service information of at least one service to be deactivated.

Therefore, during the registration procedure to the network entity, the terminal sends indication information carrying a list of services to be activated and/or a list of services to be deactivated to the network entity.

In the above solution, the service information at least includes identification information of a service.

In an implementation, the service information further includes identification information of a PLMN to which a service belongs or identification information of a network slice to which a service belongs.

In an implementation of the present disclosure, during the registration procedure to the network entity, sending, by the terminal, the indication information to the network entity may be implemented by any one of following mode 1 and mode 2.

In mode 1: the terminal sends a registration request message to the network entity, and the registration request message carries the indication information.

In mode 2: the terminal sends a registration completion message to the network entity, and the registration completion message carries the indication information.

In practical applications, the processes of registration initiated by terminals to network entities include but not limited to following cases 1 to 3.

In case 1: in a process of initiating attachment to a network entity, a terminal sends the indication information to the network entity.

In case 2: in a process of initiating location area update to a network entity, a terminal sends the indication information to the network entity.

In case 3: in a process of initiating tracking area update to a network entity, a terminal sends the indication information to the network entity.

In an implementation of the present disclosure, the indication information is further used for triggering the network entity to release a context of a service to be deactivated.

In an implementation of the present disclosure, in a situation that a network entity is changed, the terminal sends indication information to a destination network entity, wherein the indication information is used for triggering the destination network entity to perform following operations: sending the indication information to a source network entity; and receiving a context of a service to be activated sent by the source network entity.

In the above solution, the indication information is used for triggering the source network entity to perform following operations: based on the indication information, determining a service to be activated, and sending a context of the service to be activated to the destination network entity; and the indication information is used for triggering the source network entity to perform following operations: based on the indication information, determining a service to be deactivated, and deleting a context of the service to be deactivated.

In the above solution of the implementation of the present disclosure, the service to be activated or the service to be deactivated includes one or more of following services: a PDU session, a PDN connection, a QoS flow, a bearer, and a data flow.

In the above solution of the implementation of the present disclosure, the network entity is a core network element.

The technical solution of the implementations of the present disclosure will be described in detail below with reference to architecture of a 5G network.

FIG. 4 is a schematic flowchart of a method for service activation and deactivation according to an implementation of the present disclosure. As shown in FIG. 4, the method for service activation and deactivation includes following acts 401 to 422.

In act 401: a UE sends a registration request message to a RAN.

Here, the registration request message is a "Registration Request".

The registration request message may carry service information of a service to be activated and/or service information of a service to be deactivated.

In act 402: the RAN performs an AMF selection operation.

Here, the RAN selects a new AMF, and the new AMF is called a destination AMF.

In act 403: the RAN sends a registration request message to the new AMF.

Here, the registration request message is a "Registration Request".

In act 404: the new AMF sends a UE context request message to the old AMF.

Here, the UE context request message is a "Namf_Communication_UE Context Transfer". Herein, the UE context request message carries service information of a service to be activated and/or service information of a service to be deactivated.

Here, the old AMF is called a source AMF.

In act 405: the old AMF sends a UE context response message to the new AMF.

Here, the UE context response message is a "Namf_Communication_UE Context Transfer Response". Herein, the old AMF carries a context of the service to be activated in the UE context response message and send it to the new AMF.

In an implementation, the old AMF deletes a context of a service to be deactivated.

In act 406: the new AMF sends an identity request message to the UE.

Here, the identity request message is an "Identity Request".

In act 407: the UE sends an identity response message to the new AMF.

Here, the identity response message is an "Identity Response".

In act 408: the new AMF performs an AUSF selection operation.

In act 409: the new AMF performs an authentication/security operation with each network element and UE.

In act 410: the new AMF sends a registration completion notification message to the old AMF.

Here, the registration completion notification message is a "Namf_Communication_Registration Complete Notify".

In act 411: the new AMF sends an identity request message to the UE and receives an identity response message sent by the UE.

Here, the identity request message is an "Identity Request", and the identity response message is an "Identity Response."

In act 412: the new AMF sends an ME identity confirmation message to an Equipment Identity Register (EIR) and receives a response message sent by the EIR.

Here, the identity confirmation message is an "N5g-eir ME Identity Check_Get".

In act 413: the new AMF performs a UDM selection operation.

In acts 414a-414b: the new AMF performs registration/subscription retrieval with each network element.

In act 414c: the UDM sends a UE context management deregistration notification message to the old AMF.

Here, the UE context management deregistration notification message is a "Nudm_UE Context Management_Deregistration Notify".

In act 415: the new AMF performs a PCF selection operation.

In act 416: the new AMF performs policy control acquisition with the PCF.

Here, the policy control acquisition message is a "Npcf_AM Policy Control_Get".

In act 417: The new AMF sends a notification message to an SMF.

Here, the notification message is a "Namf_Event Exposure_Notify (UE reachability state with PDU status)".

In act 418: the new AMF sends an N2 request message to a Non-3GPP Interworking Function (N3IWF).

In act 419: the N3IWF sends an N2 response message to the new AMF.

In act 420: the old AMF perform policy control deletion with the PCF.

In act 421: the new AMF sends a registration acceptance message to the UE.

Here, the registration acceptance message is a "Registration Accept".

In act 422: the UE sends a registration completion message to the new AMF.

Here, the registration completion message is a "Registration Complete".

Here, the registration completion message may carry service information of a service to be activated and/or service information of a service to be deactivated.

In the above solution, after receiving the registration request from the terminal, the new AMF will acquire a context of a service to be activated from the old AMF. In an implementation, the new AMF further notifies the old AMF of a service to be deactivated. After receiving a notification from the new AMF, the old AMF will delete a context of a service not in the list of services to be activated or a service in the list of services to be deactivated.

Figure 5:
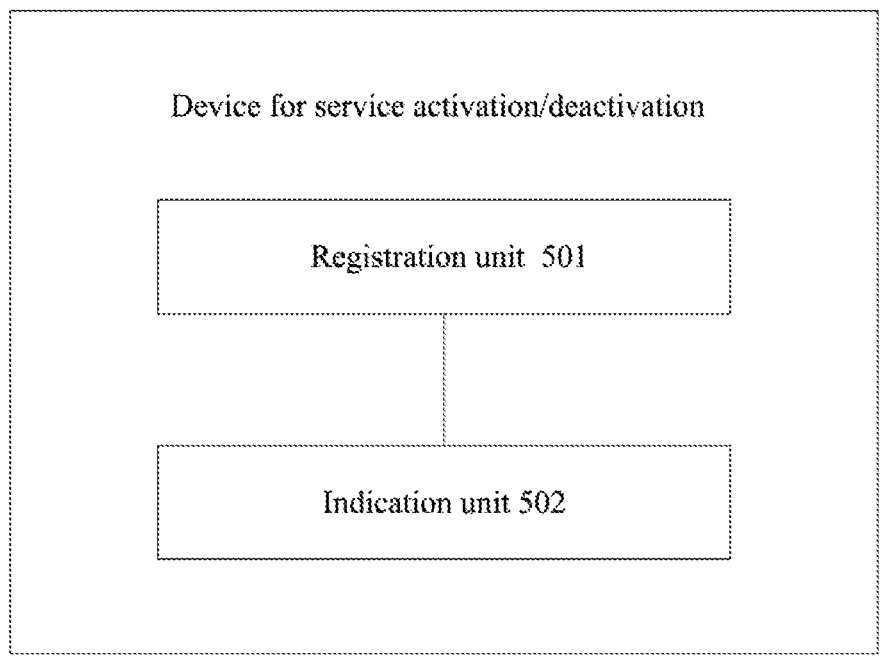
FIG. 5 is a schematic diagram of structure of a device for service activation and deactivation according to an implementation of the present disclosure.

FIG. 5 is a schematic diagram of structure of a device for service activation and deactivation according to an implementation of the present disclosure. As shown in FIG. 5, the device includes a registration unit 501 and an indication unit 502.

The registration unit 501 is configured to initiate a registration procedure to a network entity.

The indication unit 502 is configured to, during the registration procedure to the network entity, send indication information to the network entity, wherein the indication information is used for indicating a service to be activated and/or a service to be deactivated to the network entity.

In an implementation, the indication unit 502 is specifically configured to, during the registration procedure to the network entity, send indication information carrying a list of services to be activated and/or a list of services to be deactivated to the network entity.

Herein, the list of services to be activated includes service information of at least one service to be activated, and the list of services to be deactivated includes service information of at least one service to be deactivated.

In an implementation, the service information at least includes identification information of a service.

In an implementation, the service information at least includes identification information of a PLMN to which a service belongs or identification information of a network slice to which a service belongs.

In an implementation, the indication unit 502 is specifically configured to send a registration request message to the network entity, wherein the registration request message carries the indication information.

In an implementation, the indication unit 502 is specifically configured to send a registration completion message to the network entity, wherein the registration completion message carries the indication information.

In an implementation, the indication unit 502 is specifically configured to, in a process of initiating attachment to the network entity, send the indication information to the network entity.

In an implementation, the indication unit 502 is specifically configured to, in a process of initiating location area update to the network entity, send the indication information to the network entity.

In an implementation, the indication unit 502 is specifically configured to, in a process of initiating tracking area update to the network entity, send the indication information to the network entity.

In an implementation, the indication information is further used for triggering the network entity to release a context of a service to be deactivated.

In an implementation, in a situation that a network entity is changed, the indication unit 502 is specifically configured to send the indication information to a destination network entity, wherein the indication information is used for triggering the destination network entity to perform following operations: sending the indication information to a source network entity; receiving a context of a service to be activated sent by the source network entity.

In an implementation, the indication information is used for triggering the source network entity to perform following operations: based on the indication information, determining a service to be activated, and sending a context of the service to be activated to the destination network entity; and the indication information is used for triggering the source network entity to perform following operations: based on the indication information, determining a service to be deactivated, and deleting a context of the service to be deactivated.

In an implementation, the service to be activated or the service to be deactivated includes one or more of following services: a PDU session, a PDN connection, a QoS flow, a bearer, and a data flow.

In an implementation, the network entity is a core network element.

One person skilled in the art should understand that the implementation functions of each unit in the device for service activation and deactivation shown in FIG. 5 may be understood with reference to the above description of the method for service activation and deactivation. The functions of each unit in the device for service activation and deactivation shown in FIG. 5 may be implemented by a program running on a processor or by a specific logic circuit.

The above device for service activation and deactivation in the implementation of the present disclosure may also be stored in a computer readable storage medium when it is implemented in a form of a software function module and sold or used as an independent product. Based on this understanding, the technical solutions in the implementations of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present disclosure. The aforementioned storage medium includes a U disk, a mobile hard disk, a read-only memory (ROM), a magnetic disk or an optical disk, and another media capable of storing program codes. Thus, the implementations of the present disclosure are not limited to any specific combination of hardware and software.

Correspondingly, an implementation of the present disclosure further provides a computer storage medium on which computer executable instructions are stored, and when the computer executable instructions are executed by a processor, the above methods for service activation and deactivation according to the implementation of the present disclosure are implemented.

Figure 6:
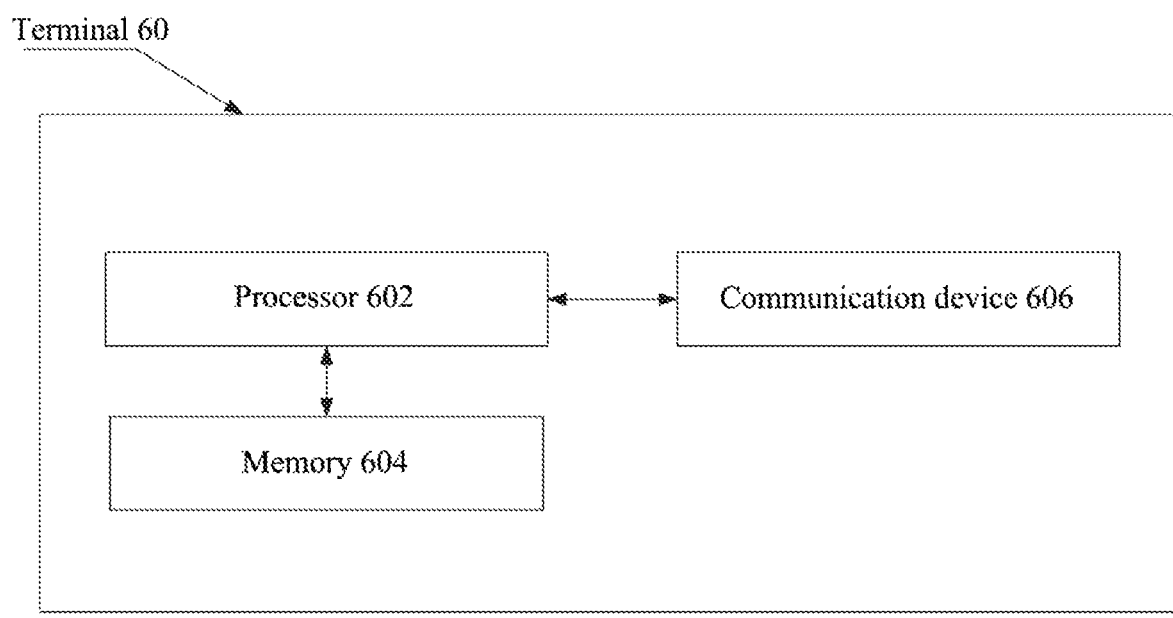
FIG. 6 is a schematic diagram of structure of a terminal according to an implementation of the present disclosure.

FIG. 6 is a schematic diagram of structure of a terminal according to an implementation of the present disclosure. As shown in FIG. 6, the terminal 60 may include one or more (only one is shown in the figure) processors 602 (the processors 602 may include, but are not limited to, processing devices such as a microprocessor (MCU), a programmable logic device (FPGA)), a memory 604 for storing data, and a transmission device 606 for communication functions. One person of ordinary skill in the art may understand that the structure shown in FIG. 6 is only schematic and does not limit the structure of the above electronic device. For example, the terminal 60 may further include more or fewer components than that shown in FIG. 6, or have a different configuration than that shown in FIG. 6.

The memory 604 may be used for storing software programs and modules of application software, such as program instructions/modules corresponding to the method for service activation and deactivation in the implementation of the present disclosure. The processor 602 executes various functional applications and data processing by performing the software programs and modules stored in the memory 604, so as to implement the above method. The memory 604 may include high-speed random access memory and may further include non-volatile memory such as one or more magnetic storage devices, a flash memory, or other non-volatile solid-state memory. In some examples, the memory 604 may further include memory remotely disposed with respect to the processor 602, which may be connected to the terminal 60 through a network. Examples of the above networks include, but are not limited to, an Internet, an intranet, a local area network, a mobile communication network, and combinations thereof.

The transmission device 606 is configured to receive or transmit data via a network. The specific example of the network described above may include a wireless network provided by a communication provider of the terminal 60. In one example, the transmission device 606 includes a network interface controller (NIC), which may be connected to other network devices through a base station so as to communicate with the Internet. In one example, the transmission device 606 may be a Radio Frequency (RF) module which is used for communicating with the Internet via wireless mode.

The technical solutions described in the implementations of the present disclosure may be combined arbitrarily without conflict.

In several implementations provided by the present disclosure, it should be understood that the disclosed methods and intelligent devices may be implemented in other ways. The device implementations described above are only illustrative, for example, a division of units is only a logical function division, and there may be other division modes in actual implementation. For example, multiple units or components may be combined or integrated into another system, or some features may be ignored or not executed. In addition, the mutual coupling or direct coupling or communication connection between various components shown or discussed may be indirect coupling or communication connection through some interface, apparatus or unit, and may be electrical, mechanical or in other forms.

The unit described as a separate component may or may not be physically separated, and the component shown as a unit may or may not be a physical unit, i.e., it may be located in one place or may be distributed over multiple network units. Some or all of the units may be selected according to practical needs to achieve a purpose of the implementations.

In addition, various functional units in various implementations of the present disclosure may be integrated in one second processing unit, or various units may be present separately, or two or more units may be integrated in one unit. The above-mentioned integrated units may be implemented in a form of hardware or in a form of hardware plus software functional units.

What are described above are merely example implementations of the present disclosure, but the protection scope of the present disclosure is not limited thereto. Any person skilled in the art may easily conceive variations or substitutions within the technical scope disclosed by the present disclosure, which should be included within the protection scope of the present disclosure.

What is claimed is:

1. A method for service activation and deactivation, comprising:

during a registration procedure initiated by a terminal to a destination Access and Mobility Management Function (AMF), sending, by the terminal, indication information to the destination AMF, wherein the indication information is used for indicating at least one of a service to be activated or a service to be deactivated to the destination AMF;

wherein the indication information is further used for triggering the destination AMF to send the indication information to a source AMF, and receive a context of the service to be activated sent by the source AMF;

wherein the indication information is further used for triggering the source AMF to determine the service to be activated based on the indication information and send the context of the service to be activated to the destination AMF; and wherein the indication information is further used for triggering the source AMF to determine the service to be deactivated based on the indication information and delete a context of the service to be deactivated.

2. The method of claim 1, wherein during the registration procedure initiated by the terminal to the destination AMF, sending, by the terminal, the indication information to the destination AMF comprises:

during the registration procedure initiated by the terminal to the destination AMF, sending, by the terminal, the indication information carrying at least one of a list of services to be activated or a list of services to be deactivated to the destination AMF.

3. The method of claim 2, wherein the list of services to be activated comprises service information of at least one service to be activated, and the list of services to be deactivated comprises service information of at least one service to be deactivated.

4. The method of claim 3, wherein the service information comprises identification information of a service.

5. The method of claim 3, wherein the service information comprises identification information of a public land mobile network (PLMN) entity to which a service belongs or identification information of a network slice to which a service belongs.

6. The method of claim 1, wherein sending, by the terminal, the indication information to the destination AMF comprises:

sending, by the terminal, a registration request message to the destination AMF, wherein the registration request message carries the indication information.

7. The method of claim 1, wherein sending, by the terminal, the indication information to the destination AMF comprises:

sending, by the terminal, a registration completion message to the destination AMF, wherein the registration completion message carries the indication information.

8. The method of claim 1, wherein during the registration procedure initiated by the terminal to the destination AMF, sending, by the terminal, the indication information to the destination AMF comprises:

in a process of initiating attachment to the destination AMF, sending, by the terminal, the indication information to the destination AMF.

9. The method of claim 1, wherein during the registration procedure initiated by the terminal to the destination AMF, sending, by the terminal, the indication information to the destination AMF comprises:

in a process of initiating location area update to the destination AMF, sending, by the terminal, the indication information to the destination AMF.

10. The method of claim 1, wherein during the registration procedure initiated by the terminal to the destination AMF, sending, by the terminal, the indication information to the destination AMF comprises:

in a process of initiating tracking area update to the destination AMF, sending, by the terminal, the indication information to the destination AMF.

11. The method of claim 1, wherein the indication information is further used for triggering the destination AMF to release a context of the service to be deactivated.

12. The method of claim 1, wherein the service to be activated or the service to be deactivated comprises one or more of following services:

a Protocol Data Unit (PDU) session, a Packet Data Network (PDN) connection, a Quality of Service (QoS) flow, a bearer, or a data flow.

13. A device for service activation and deactivation, comprising a processor and a communication device, wherein the processor is configured to initiate a registration procedure to a destination Access and Mobility Management Function (AMF) through the communication device; and during the registration procedure to the destination AMF, send indication information to the destination AMF through the communication device;

wherein the indication information is used for indicating at least one of a service to be activated or a service to be deactivated to the destination AMF;

wherein the indication information is further used for triggering the destination AMF to send the indication information to a source AMF and receive a context of the service to be activated sent by the source AMF;

wherein the indication information is further used for triggering the source AMF to determine the service to be activated based on the indication information and send the context of the service to be activated to the destination AMF; and wherein the indication information is further used for triggering the source AMF to determine the service to be deactivated based on the indication information and delete a context of the service to be deactivated.

14. The device of claim 13, wherein the processor is configured to, during the registration procedure to the destination AMF, send the indication information carrying at least one of a list of services to be activated or a list of services to be deactivated to the destination AMF through the communication device.

15. The device of claim 14, wherein the list of services to be activated comprises service information of at least one service to be activated, and the list of services to be deactivated comprises service information of at least one service to be deactivated.

16. The device of claim 15, wherein the service information comprises identification information of a service.

17. The device to claim 15, wherein the service information comprises identification information of a public land mobile network (PLMN) entity to which a service belongs or identification information of a network slice to which a service belongs.

18. The device of claim 13, wherein the processor is configured to send a registration request message to the destination AMF through the communication device, wherein the registration request message carries the indication information.

19. The device of claim 13, wherein the processor is configured to send a registration completion message to the destination AMF, wherein the registration completion message carries the indication information.

20. The device of claim 13, wherein the processor is configured to, in a process of initiating attachment to the destination AMF, send the indication information to the destination AMF through the communication device.

21. The device of claim 13, wherein the processor is configured to, in a process of initiating location area update to the destination AMF, send the indication information to the destination AMF through the communication device.

22. The device of claim 13, wherein the processor is configured to, in a process of initiating tracking area update to the destination AMF, send the indication information to the destination AMF through the communication device.

23. The device of claim 13, wherein the indication information is further used for triggering the destination AMF to release a context of the service to be deactivated.

24. The device of claim 13, wherein the service to be activated or the service to be deactivated comprises one or more of following services:
   a Protocol Data Unit (PDU) session, a Packet Data Network (PDN) connection, a Quality of Service (QoS) flow, a bearer, or a data flow.

* * * * *